United States Patent
Brehmer

(10) Patent No.: US 11,060,586 B2
(45) Date of Patent: Jul. 13, 2021

(54) MOTOR VEHICLE TRANSMISSION ARRANGEMENT

(71) Applicant: ZF Friedrichshafen AG, Friedrichshafen (DE)

(72) Inventor: Martin Brehmer, Tettnang (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/683,489

(22) Filed: Nov. 14, 2019

(65) Prior Publication Data
US 2020/0158212 A1 May 21, 2020

(30) Foreign Application Priority Data
Nov. 16, 2018 (DE) .................... 10 2018 219 653.2

(51) Int. Cl.
*F16H 3/66* (2006.01)
*B60K 6/365* (2007.10)
(Continued)

(52) U.S. Cl.
CPC .............. *F16H 3/66* (2013.01); *B60K 6/365* (2013.01); *B60K 6/405* (2013.01); *B60K 6/48* (2013.01);
(Continued)

(58) Field of Classification Search
CPC ............... F16H 3/66; F16H 2200/2097; F16H 57/0476; F16H 45/02; B60K 6/365;
(Continued)

(56) References Cited

U.S. PATENT DOCUMENTS 6,371,877 B1 4/2002 Schroeder et al.
6,746,354 B1 6/2004 Ziemer
(Continued)

FOREIGN PATENT DOCUMENTS

DE 19849051 C1 6/2000
DE 19923316 A1 11/2000
(Continued)

OTHER PUBLICATIONS

German Search Report DE102018219653.2, dated Aug. 2, 2019. (12 pages).

*Primary Examiner* — David J Hlavka
(74) *Attorney, Agent, or Firm* — Dority & Manning, P.A.

(57) ABSTRACT

A motor vehicle transmission arrangement (21) may include a transmission housing (8), a transmission gearing (2), and a hydrodynamic torque converter (1) operatively connected to the transmission gearing (2). The arrangement (21) may further include a shift element (K0) and an internal combustion engine (VM) operatively connectable to the hydrodynamic torque converter (1) by the shift element (K0). Additionally, the arrangement (21) may include a gear set (6) having a constant gear ratio, and at least one electric machine (EM) as a drive, where the electric machine (EM) is operatively connected to the hydrodynamic torque converter (1) by the gear set (6). The electric machine (EM), the gear set (6), the shift element (K0), and the torque converter (1) are arranged in a wet space area (7) of the transmission housing (8). The gear set (6) is upstream from the shift element (K0) in the direction of power flow.

14 Claims, 4 Drawing Sheets

(51) Int. Cl.
*B60K 6/405* (2007.10)
*B60K 6/48* (2007.10)

(52) U.S. Cl.
CPC .............. *B60K 2006/4825* (2013.01); *F16H 2200/2097* (2013.01)

(58) Field of Classification Search
CPC .. B60K 6/405; B60K 2006/4825; B60K 6/48; B60K 6/387; B60K 6/40; B60K 2006/4833
See application file for complete search history.

(56) References Cited

U.S. PATENT DOCUMENTS

| | | | |
|---|---|---|---|
| 7,670,249 B2* | 3/2010 | Thomas | F16H 3/663 |
| | | | 475/276 |
| 7,690,454 B2 | 4/2010 | Rose | |
| 8,444,519 B2* | 5/2013 | Borntraeger | B60K 6/26 |
| | | | 475/5 |
| 2016/0160979 A1* | 6/2016 | Furcoiu | F16H 45/02 |
| | | | 475/49 |
| 2018/0118012 A1 | 5/2018 | Wilton et al. | |

FOREIGN PATENT DOCUMENTS

| | | |
|---|---|---|
| DE | 102007001840 A1 | 7/2008 |
| DE | 102013209567 A1 | 11/2014 |
| DE | 102015226678 A1 | 6/2017 |
| DE | 102017125450 A1 | 5/2018 |

* cited by examiner

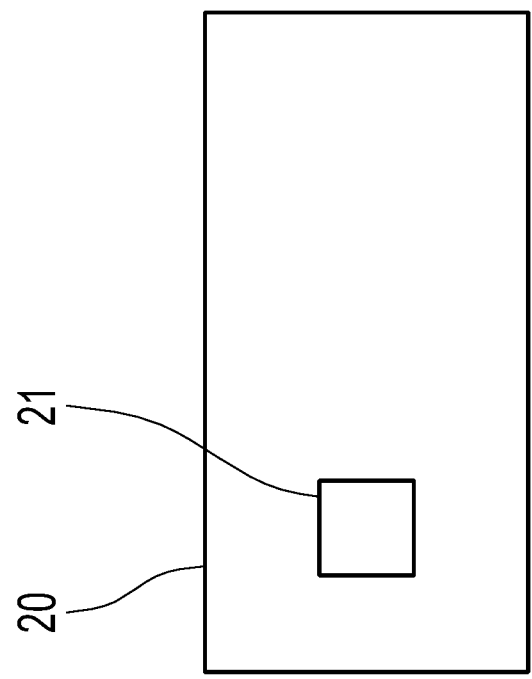

MOTOR VEHICLE TRANSMISSION ARRANGEMENT

CROSS-REFERENCE TO RELATED APPLICATION

The present application is related and has right of priority to German Patent Application No. 10 2018 219 653.2 filed on Nov. 16, 2018, the entirety of which is incorporated by reference for all purposes.

FIELD OF THE INVENTION

The present invention relates generally to a motor vehicle transmission arrangement having an internal combustion engine and at least one electric machine as a drive. Moreover, the invention relates to a vehicle having such a transmission arrangement.

BACKGROUND

Publication DE 10 2015 226 678 A1, for example, describes a transmission for a motor vehicle having an internal combustion engine and an electric machine. A rotor of the electric machine is operatively connected to a downstream transmission gearing via a planetary gear set as a pre-ratio. The internal combustion engine is connectable to or disconnectable from the transmission gearing by a shift element. A hydrodynamic torque converter is not provided in the transmission. The mounting of the rotor of the electric machine takes place exclusively via a support axle on the housing side, which requires considerable installation space.

The problem addressed by the present invention is that of providing a transmission arrangement in which an electric machine, which has a pre-ratio, and an internal combustion engine as well as a torque converter are arranged in the transmission housing in an installation-space-favorable manner, and a vehicle having such transmission arrangement.

SUMMARY OF THE INVENTION

Therefore, a transmission arrangement for a vehicle having an internal combustion engine and at least one electric machine as a drive is provided, wherein the electric machine is operatively connected to a hydrodynamic torque converter by a gear set, or the like, having a constant gear ratio as a pre-ratio, wherein the hydrodynamic torque converter is operatively connected to a transmission gearing of any type. The internal combustion engine is operatively connectable to the hydrodynamic torque converter by a shift element, so that a parallel hybrid transmission module is implemented. The electric machine, the gear set, the shift element, and the torque converter are arranged in a preferably common wet space area or oil space area of a transmission housing, wherein the gear set is arranged, viewed axially and in the direction of power flow, upstream from the shift element.

The term "operatively connected" or "operatively connectable" is understood to mean that the components are connected or connectable to one another directly or by further components.

Due to the electric machine, which has a pre-ratio, in the provided transmission arrangement, a smoothed overall drive torque relative to the electric drive torque from the electric machine and to the drive torque from the internal combustion engine is ensured. In addition, a possible arrangement is achieved, which has been optimized with respect to installation space. Due to the fact that the electric machine, the gear set, the shift element, as well as the torque converter are arranged in a common wet space area of the transmission housing, considerably simplified cooling and lube oil conditions also result with respect to the provided transmission arrangement. Due to the provided sequence of the gear set and the shift element, the pre-ratio can achieve a desired torque increase with respect to the electric drive torque.

Within the scope of a first embodiment of the present invention, it is provided that the shift element is arranged axially between the gear set and the hydrodynamic torque converter in the wet space area. Therefore, a particularly installation-space-saving arrangement is made possible, on the one hand, and, on the other hand, a gear set is implemented as a pre-ratio exclusively for the electric drive torque. In addition, the electric machine is arrangeable, in a space-saving manner, practically coaxially in the radially outer circumferential area in the wet space area of the transmission housing.

In order to implement a particularly installation-space-optimized mounting, in particular, of the rotor of the electric machine in the provided transmission arrangement, it is provided that the rotor of the electric machine is supported at its output end, by a first bearing shield, on a central hub and at its input end by the components of the gear set. This embodiment is characterized by its particularly structurally simple configuration.

Within the scope of another embodiment, it is possible that the first bearing shield is again mounted on the central hub in order to support the rotor of the electric machine at its output end.

At its input end, however, the rotor of the electric machine is supported on the transmission housing side by a second bearing shield. In this embodiment, the mounting is implemented without the support on the gear set, which allows for a particularly smoothed and stable mounting of the rotor of the electric machine.

The central hub provided for the mounting is arrangeable, for example, coaxially to an input shaft of the transmission gearing and is supportable thereon. Since the central hub for the mounting of further components is already available, the central hub is also particularly advantageously usable for mounting the rotor of the electric machine without the need for additional components.

Preferably, a planetary gear set, or the like, is usable as a gear set having a constant gear ratio. Therefore, the term "gear set as pre-ratio" is understood to mean that a gear set having a constant ratio for the electric drive is implemented.

One further aspect of the present invention provides that a vehicle including the above-described transmission arrangement is also claimed. This yields the above-described advantages and further advantages of the invention.

BRIEF DESCRIPTION OF THE DRAWINGS

The present invention is explained in greater detail in the following with reference to the drawings. Wherein:

FIG. 4 shows a schematic view of a vehicle having the transmission arrangement shown in FIG. 1.

DETAILED DESCRIPTION

Figure 1:
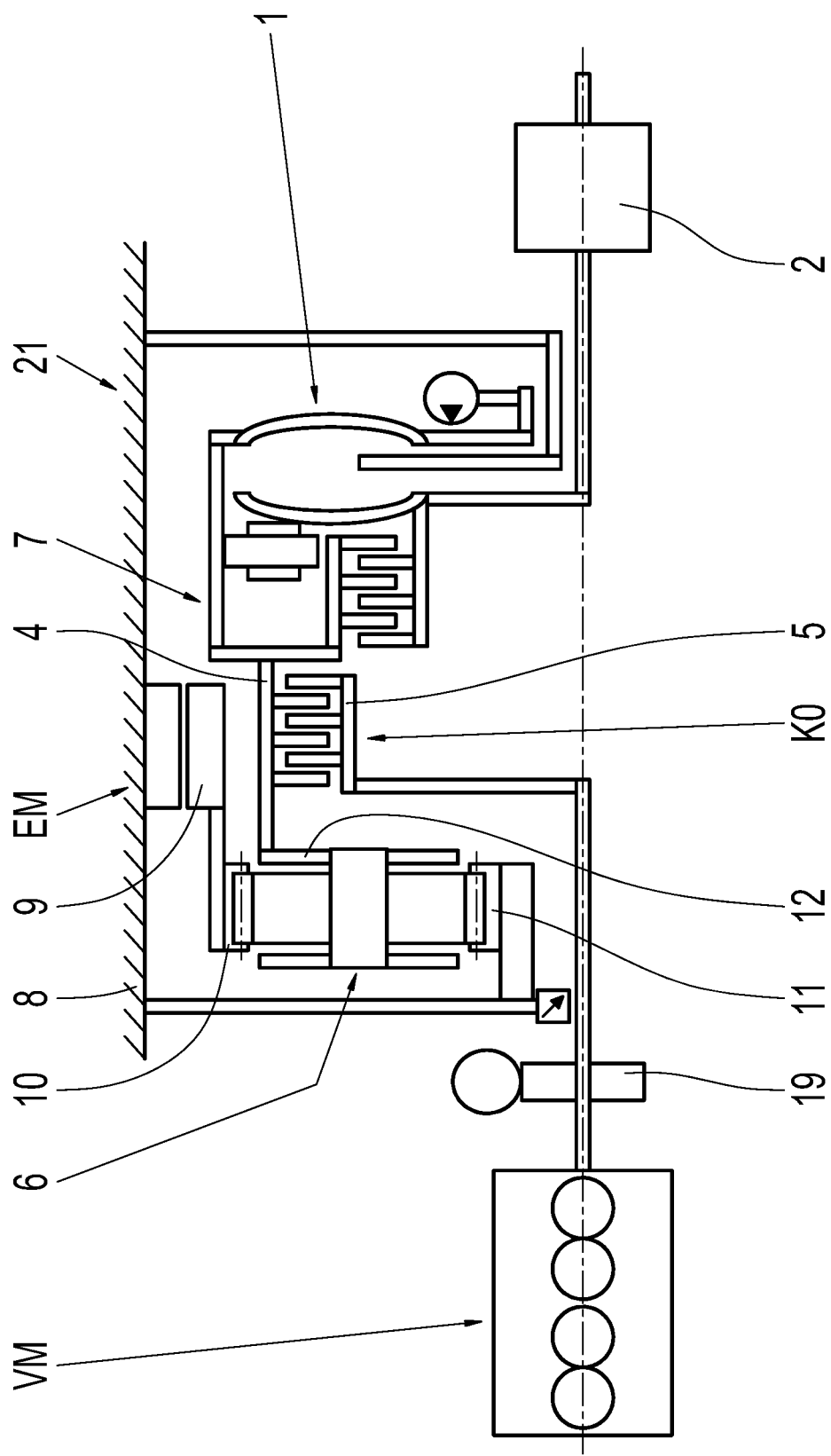
FIG. 1 shows a schematic view of a transmission arrangement according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
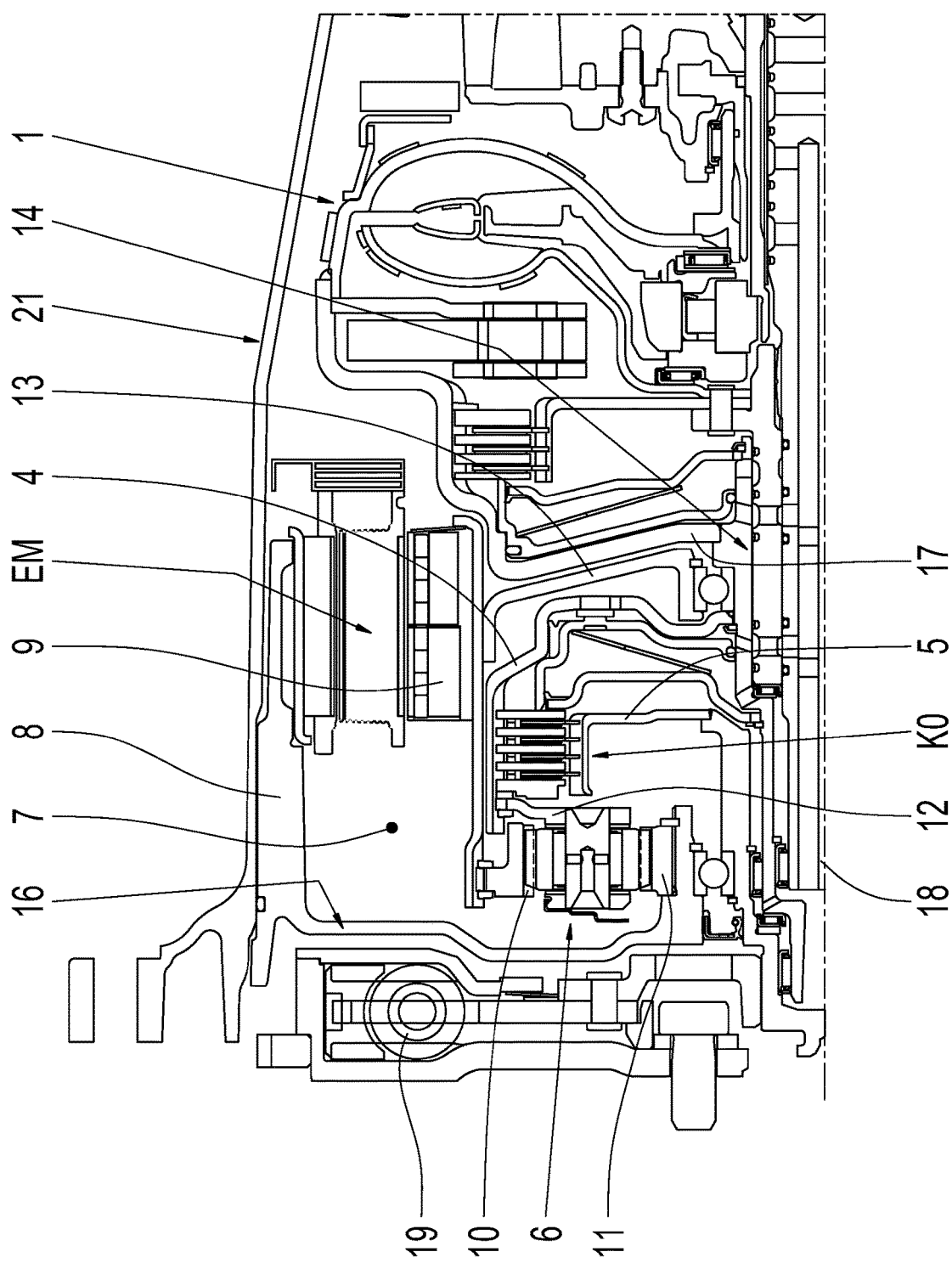
FIG. 2 shows a partial section view of a first embodiment of the transmission arrangement shown in FIG. 1.
Figure 3:
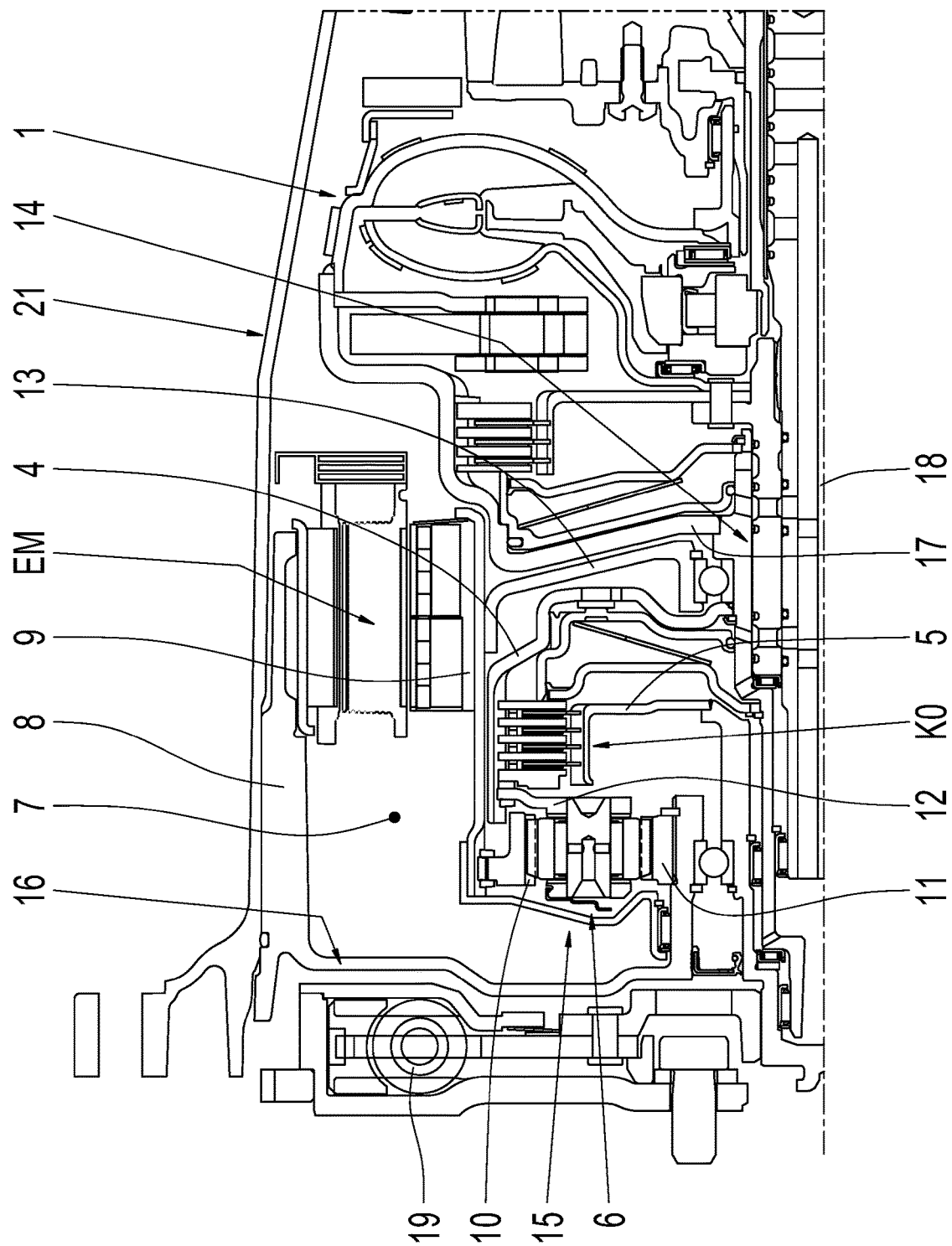
FIG. 3 shows a partial section view of a second embodiment variant of the transmission arrangement shown in FIG. 1.

Various views of a transmission arrangement 21 according to the invention for a motor vehicle 20 are represented merely by way of example in FIGS. 1-3.

The transmission arrangement 21 has an internal combustion engine VM and an electric machine EM as a drive. The electric machine EM is operable both as a motor and as a generator. The electric machine EM is operatively connected to a hydrodynamic torque converter 1 by a gear set 6 having a constant gear ratio as a pre-ratio. The gear set 6 is, for example, a planetary gear set. Downstream of the gear set 6, the hydrodynamic torque converter 1 is operatively connected to a transmission gearing 2. The transmission gearing 2 can be any type of transmission, such as an automatic transmission, or the like.

The internal combustion engine VM is operatively connectable to the hydrodynamic torque converter 1 by a shift element K0. This means, when the shift element K0 is engaged, the internal combustion engine VM transmits a corresponding drive torque to the torque converter 1 and, therefore, to the transmission gearing 2. The drive torque from the internal combustion engine is supplementable by an appropriate electric drive torque of the electric machine EM, which has a pre-ratio. Moreover, it is possible that the internal combustion engine VM is disconnectable from the torque converter 1, for example, during purely electric driving, by disengaging the shift element K0. In this way, a parallel hybrid transmission module is implemented in the provided transmission arrangement 21.

Any type of shift element can be provided as the shift element K0. Preferably, a frictional separating clutch having an outer disk carrier 4 and an inner disk carrier 5 is usable, wherein the inner disk carrier 5 is operatively connected, for example, to the internal combustion engine VM, and the outer disk carrier 4 is operatively connected to the gear set 6 of the electric machine EM.

As is apparent, in particular, from the schematic according to FIG. 1, the electric machine EM, the gear set 6, the shift element K0, and the torque converter 1 are arranged in a common wet space area 7 of a transmission housing 8, wherein the gear set 6 is arranged, viewed axially and in the direction of power flow, upstream from the shift element K0. Accordingly, the gear set 6 is arranged, viewed spatially and also with respect to function, upstream from the shift element K0.

In order to implement an optimized mounting of a rotor 9 of the electric machine EM in the provided spatial arrangement, two possible embodiments of the transmission arrangement 21 are represented, for example, in FIGS. 2 and 3, wherein a first embodiment of the transmission arrangement 21 having a first mounting configuration of the rotor 9 of the electric machine EM is shown in FIG. 2 and a second embodiment having a further mounting configuration of the rotor 9 of the electric machine EM is shown in FIG. 3.

Regardless of the particular embodiment, it is provided that the rotor 9 of the electric machine EM is operatively connected to a ring gear 10 of the planetary gear set as the gear set 6. A sun gear 11 of the planetary gear set 6 is operatively connected to the transmission housing 8, while a planet gear carrier 12 of the planetary gear set 6 is operatively connected to the hydrodynamic torque converter 1. The shift element K0, as a clutch, is operatively connected to the internal combustion engine VM by the inner disk carrier 5, wherein the operative connection between the inner disk carrier 5 and the internal combustion engine VM includes a vibration damper 19, which is arranged, by way of example, outside the wet space 7 of the transmission housing 8.

FIG. 2 shows the first embodiment of the transmission arrangement 21 for the mounting of the rotor 9 of the electric machine EM, in which the rotor 9 is supported at its output end on a central hub 14 by a first bearing shield 13, and at its input end by the planetary gear set 6. Particularly, for the mounting by the planetary gear set 6, the rotor 9 is supported at its input end by the ring gear 10 of the planetary gear set 6.

FIG. 3 shows the second embodiment of the transmission arrangement 21 for the mounting of the rotor 9 of the electric machine EM, in which the rotor 9 is supported at its output end on the central hub 14 by the first bearing shield 13, and at its input end on the transmission housing 8 by a second bearing shield 15. The second bearing shield 15 is supported on the transmission housing 8 by a transmission housing bearing shield 16.

The first bearing shield 13 is arranged, in an installation-space-favorable manner, axially between the outer disk carrier 4 of the frictional separating clutch K0, which is supported on the central hub side, and a torque converter housing 17 of the torque converter 1, which is supported on the central hub side. The central hub 14 is arranged coaxially to an input shaft 18 of the transmission gearing 2 and is mounted thereon.

FIG. 4 shows a schematic view of a vehicle or a motor vehicle 20 having the above-described transmission arrangement 21.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 torque converter
2 transmission gearing
K0 shift element or frictional shift element as clutch
4 outer disk carrier
5 inner disk carrier
6 gear set having a constant gear ratio as a pre-ratio
7 wet space area
8 transmission housing
9 rotor 10 ring gear
11 sun gear
12 planet gear carrier
13 first bearing shield
14 central hub
15 second bearing shield
16 transmission housing bearing shield
17 torque converter housing
18 input shaft of the transmission gearing
19 vibration damper
20 vehicle or motor vehicle
21 transmission arrangement
EM electric machine
VM internal combustion engine

The invention claimed is:

1. A transmission arrangement (21) for a motor vehicle (20), comprising:
    a transmission housing (8);
    a transmission gearing (2);
    a hydrodynamic torque converter (1) operatively connected to the transmission gearing (2);
    a shift element (K0);
    an internal combustion engine (VM) operatively connectable to the hydrodynamic torque converter (1) by the shift element (K0);
    a gear set (6) having a constant gear ratio; and
    at least one electric machine (EM) as a drive, the electric machine (EM) being operatively connected to the hydrodynamic torque converter (1) by the gear set (6),
    wherein the electric machine (EM), the gear set (6), the shift element (K0), and the torque converter (1) are arranged in a wet space area (7) of the transmission housing (8), and
    wherein the gear set (6) is arranged in power flow between the shift element (K0) and the electric machine (EM).

2. The transmission arrangement (21) of claim 1, wherein the shift element (K0) is arranged axially between the gear set (6) and the hydrodynamic torque converter (1) in the wet space area (7).

3. The transmission arrangement (21) of claim 1, wherein a rotor (9) of the electric machine (EM) is supported by a first bearing shield (13) on a central hub (14) and by the gear set (6).

4. The transmission arrangement (21) of claim 3, wherein the first bearing shield (13) is arranged axially between an outer disk carrier (4) of the shift element (K0) and a torque converter housing (17), the outer disk carrier (4) and the torque converter housing (17) being supported on the central hub (14).

5. The transmission arrangement (21) of claim 3, wherein the central hub (14) is arranged coaxially to an input shaft (18) of the transmission gearing (2), and the central hub (14) is mounted on the input shaft (18).

6. The transmission arrangement (21) of claim 1, wherein a rotor (9) of the electric machine (EM) is supported by a first bearing shield (13) on a central hub (14) and by a second bearing shield (15).

7. The transmission arrangement (21) of claim 6, wherein the first bearing shield (13) is arranged axially between an outer disk carrier (4) of the shift element (K0) and a torque converter housing (17), the outer disk carrier (4) and the torque converter housing (17) being supported on the central hub (14).

8. The transmission arrangement (21) of claim 6, wherein the central hub (14) is arranged coaxially to an input shaft (18) of the transmission gearing (2), and the central hub (14) is mounted on the input shaft (18).

9. The transmission arrangement (21) of claim 6, wherein the second bearing shield (15) is supported on a transmission housing bearing shield (16).

10. The transmission arrangement (21) of claim 1, wherein the gear set (6) is a planetary gear set.

11. The transmission arrangement (21) of claim 10, wherein a rotor (9) of the electric machine (EM) is operatively connected to a ring gear (10) of the planetary gear set, a sun gear (11) of the planetary gear set is operatively connected to the transmission housing (8), and a planetary gear carrier (12) of the planetary gear set is operatively connected to the hydrodynamic torque converter (1).

12. The transmission arrangement (21) of claim 1, wherein the transmission arrangement (21) is a parallel hybrid transmission arrangement.

13. A vehicle (20), comprising the transmission arrangement (21) of claim 1.

14. The transmission arrangement (21) of claim 1, wherein the gear set (6) is arranged axially between the internal combustion engine (VM) and the shift element (K0).

* * * * *